(12) United States Patent
Suzuki et al.

(10) Patent No.: US 10,117,312 B2
(45) Date of Patent: Oct. 30, 2018

(54) LIGHT SOURCE DEVICE, PROJECTION DISPLAY DEVICE, AND LIGHT SOURCE CONTROL METHOD

(71) Applicant: NEC Display Solutions, Ltd., Tokyo (JP)

(72) Inventors: Kenji Suzuki, Tokyo (JP); Takashi Kaido, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/311,489

(22) PCT Filed: May 28, 2014

(86) PCT No.: PCT/JP2014/064158
§ 371 (c)(1),
(2) Date: Nov. 15, 2016

(87) PCT Pub. No.: WO2015/181913
PCT Pub. Date: Dec. 3, 2015

(65) Prior Publication Data
US 2017/0094751 A1 Mar. 30, 2017

(51) Int. Cl.
*G03B 21/00* (2006.01)
*H05B 37/02* (2006.01)
(Continued)

(52) U.S. Cl.
CPC ....... *H05B 37/0227* (2013.01); *G02B 26/008* (2013.01); *G03B 21/204* (2013.01); *G03B 21/2053* (2013.01)

(58) Field of Classification Search
CPC .............. G03B 21/204; G03B 21/2033; G03B 21/2053; G03B 17/54; G02B 26/008; H05B 33/0845; H05B 37/0227
(Continued)

(56) References Cited

U.S. PATENT DOCUMENTS

| | | | |
|---|---|---|---|
| 8,858,000 B2 | 10/2014 | Tsuda et al. | |
| 9,063,403 B2 | 6/2015 | Tsuda et al. | |

(Continued)

FOREIGN PATENT DOCUMENTS

| | | |
|---|---|---|
| JP | S 63-216748 A | 9/1988 |
| JP | 2002-367208 A | 12/2002 |

(Continued)

OTHER PUBLICATIONS

International Search Report (ISR) (PCT Form PCT/ISA/210), in PCT/JP2014/064158, dated Sep. 9, 2014.
(Continued)

*Primary Examiner* — Douglas W Owens
*Assistant Examiner* — Amy Yang
(74) *Attorney, Agent, or Firm* — McGinn I.P. Law Group, PLLC (57) ABSTRACT

A light source device includes: an excitation light source unit that emits excitation light; a phosphor wheel unit that includes a wheel that produces fluorescence by the excitation light and that, by causing the wheel to rotate, changes the position on the wheel that is irradiated by the excitation light; a detection unit that detects rotation of the wheel; and a control unit that changes intensity of the excitation light on the basis of the detection result of the detection unit and the fluorescence characteristic of the wheel.

16 Claims, 4 Drawing Sheets

(51) Int. Cl.
*G02B 26/00* (2006.01)
*G03B 21/20* (2006.01)

(58) Field of Classification Search
USPC ......... 315/287, 151, 360; 353/84, 85, 94, 31
See application file for complete search history.

(56) References Cited

U.S. PATENT DOCUMENTS

| | | | | |
|---|---|---|---|---|
| 2006/0255838 | A1* | 11/2006 | Bergmann | H05B 33/0812 |
| | | | | 327/66 |
| 2007/0127530 | A1* | 6/2007 | Pan | H01S 5/06832 |
| | | | | 372/38.02 |
| 2011/0248637 | A1* | 10/2011 | Mitsuyasu | H05B 33/0815 |
| | | | | 315/178 |
| 2011/0248640 | A1* | 10/2011 | Welten | H05B 33/083 |
| | | | | 315/210 |
| 2012/0050691 | A1 | 3/2012 | Tsuda et al. | |
| 2012/0188516 | A1* | 7/2012 | Kashiwagi | G02B 7/006 |
| | | | | 353/31 |
| 2013/0021580 | A1* | 1/2013 | Morgan | G03B 21/2033 |
| | | | | 353/31 |
| 2014/0312777 | A1* | 10/2014 | Shearer | H05B 33/0869 |
| | | | | 315/151 |
| 2014/0375968 | A1 | 12/2014 | Tsuda et al. | |
| 2015/0257225 | A1* | 9/2015 | Yu | H05B 33/083 |
| | | | | 315/122 |

FOREIGN PATENT DOCUMENTS

| | | |
|---|---|---|
| JP | 2011-187205 A | 9/2011 |
| JP | 2011-216294 A | 10/2011 |
| JP | 2012-047951 A | 3/2012 |
| JP | 2012-078567 A | 4/2012 |
| JP | 2012-088657 A | 5/2012 |
| JP | 2012-155004 A | 8/2012 |
| JP | 2012155004 A * | 8/2012 |
| JP | 2013-190548 A | 9/2013 |
| WO | WO 2012/053057 A1 | 4/2012 |

OTHER PUBLICATIONS

Japanese Office Action dated Oct. 3, 2017 with an English translation thereof.
Japanese Office Action dated Feb. 20, 2018 in corresponding Japanese Application No. 2016-523029.

* cited by examiner

LIGHT SOURCE DEVICE, PROJECTION DISPLAY DEVICE, AND LIGHT SOURCE CONTROL METHOD

TECHNICAL FIELD

The present invention relates to a light source device that uses a phosphor wheel, a projection display device, and a light source control method.

BACKGROUND ART

Light source devices that use phosphors are known as light source devices for projectors (refer to Patent Document 1). This type of light source device includes a phosphor wheel to which a phosphor has been applied and an excitation light source that irradiates excitation light upon this phosphor wheel. The phosphor wheel emits fluorescence in response to excitation light that is irradiated from the excitation light source, and this fluorescence is used as light that illuminates a display element of the projector. In addition, because continuous irradiation by excitation light of the same position on the phosphor wheel increases the temperature, the light source device causes rotation of the phosphor wheel to change the position of irradiation on the phosphor wheel that is irradiated by the excitation light.

LITERATURE OF THE PRIOR ART

Patent Documents

Patent Document 1: WO 2012/053057A

DISCLOSER OF INVENTION

Problem to be Solved by the Invention

In a light source device that uses a phosphor, the drive voltage that is supplied to the excitation light source is typically controlled such that the intensity of the excitation light is uniform. However, the thickness and concentration of the phosphor that is applied to the phosphor wheel vary according to the position on the phosphor wheel. As a result, the intensity of the fluorescence may change according to the position of irradiation of the excitation light even when the intensity of the excitation light is uniform. When variation occurs in the fluorescence characteristic of the phosphor wheel in this way, the intensity of the fluorescence ends up changing cyclically as the excitation light is irradiated upon a rotating phosphor wheel. If these changes in the intensity of fluorescence surpass a certain level, a phenomenon referred to as flicker, in which the changes in intensity of fluorescence is recognized by a human viewer as flickering of the light, occurs.

One method to reduce flicker that can be considered is to control variation in the fluorescence characteristic by selecting and using, from among manufactured phosphor wheels, those phosphor wheels having little variation in the fluorescence characteristic, or by improving precision in the process of manufacturing phosphor wheels. In this method, however, the time and trouble involved in the selection of phosphor wheels as well as the increase in cost attendant to improving precision raise the problem of the increase of the manufacturing cost of a phosphor wheel.

Increasing the speed of rotation of the phosphor wheel can be considered as another method of reducing flicker. In this case, the speed of the cyclical change in the intensity of fluorescence emitted by the phosphor wheel increases to enable a reduction of the changes in the intensity of fluorescence that are noticeable as flicker. In this case, however, causing a phosphor wheel to rotate at a higher speed raises the problem of the shorter service life of the motor that rotates the phosphor wheel.

It is an object of the present invention to provide a light source device, a projection display device, and a light source control method that, despite the variation of the fluorescence characteristic of a phosphor wheel, can reduces the occurrence of flicker without shortening the service life of the motor.

Means for Solving the Problem

The light source device according to the present invention includes: an excitation light source unit that emits excitation light;

a phosphor wheel unit that includes a wheel that emits fluorescence in response to excitation light and that changes the position on the wheel that is irradiated by the excitation light by rotating the wheel;

a detection unit that detects the rotation of the wheel; and a control unit that changes the intensity of the excitation light based on the detection result of the detection unit and the fluorescence characteristic of the wheel.

The projection display device according to the present invention is equipped with the above-described light source device.

The light source control method according to the present invention includes: by causing a wheel that emits fluorescence in response to excitation light to rotate, changing the position on the wheel that is irradiated by the excitation light;

detecting the rotation of the wheel; and changing the intensity of the excitation light on the basis of the detection result of the rotation and the fluorescence characteristic of the wheel.

Effect of the Invention

According to the present invention, the occurrence of flicker can be reduced despite variation of the fluorescence characteristic of a phosphor wheel without shortening the service life of a motor.

DESCRIPTION OF EMBODIMENT

Exemplary embodiments of the present invention are next described with reference to the accompanying drawings. In the present specification and drawings, constituent elements having identical functions are given the same reference numbers and redundant explanation is omitted.

Figure 1:
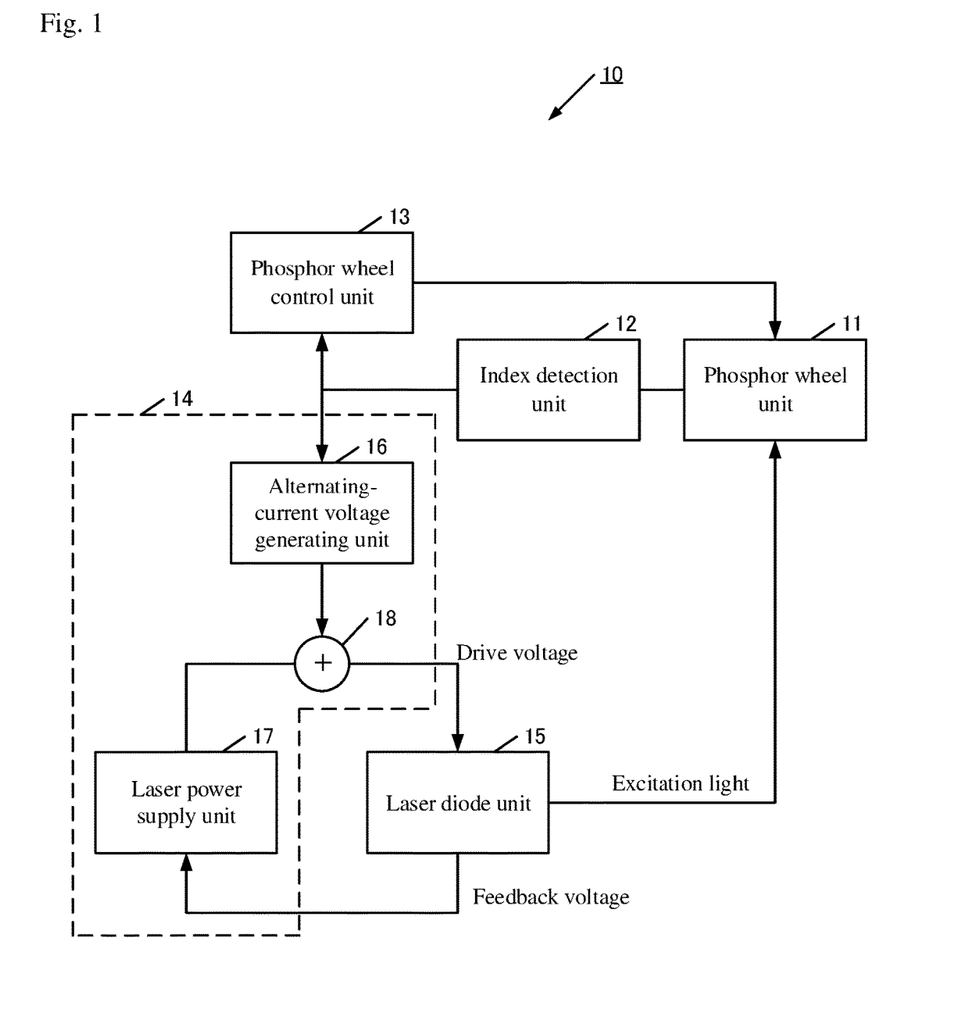
FIG. 1 is a block diagram showing the configuration of the light source device according to the first exemplary embodiment of the present invention.

FIG. 1 is a block diagram showing the configuration of light source device 10 according to the first exemplary embodiment of the present invention. Light source device 10 includes phosphor wheel unit 11, index detection unit 12, phosphor wheel control unit 13, drive voltage supply unit 14, and laser diode unit 15. In addition, drive voltage supply unit 14 includes alternating-current voltage generating unit 16 and laser power supply unit 17.

Phosphor wheel unit 11 includes a disk-shaped wheel to which a phosphor is applied, the phosphor emitting fluorescence in response to irradiated excitation light. In phosphor wheel unit 11, the position on the wheel that is irradiated by the excitation light changes by rotating the wheel. The intensity of fluorescence emitted by phosphor wheel unit 11 varies in accordance with the thickness of the phosphor in the position that is irradiated by the excitation light and in accordance with the intensity of the excitation light that is irradiated. In addition, phosphor wheel unit 11 includes an index in the wheel portion. When infrared light is irradiated upon the index, the index reflects infrared light.

Index detection unit 12 is a detection unit that detects the rotation of phosphor wheel unit 11. More specifically, index detection unit 12 irradiates infrared light upon phosphor wheel unit 11 and then detects a single rotation of phosphor wheel unit 11 from a predetermined reference position by detecting the light that is reflected when this infrared light is irradiated upon the index belonging to phosphor wheel unit 11.

Figure 2:
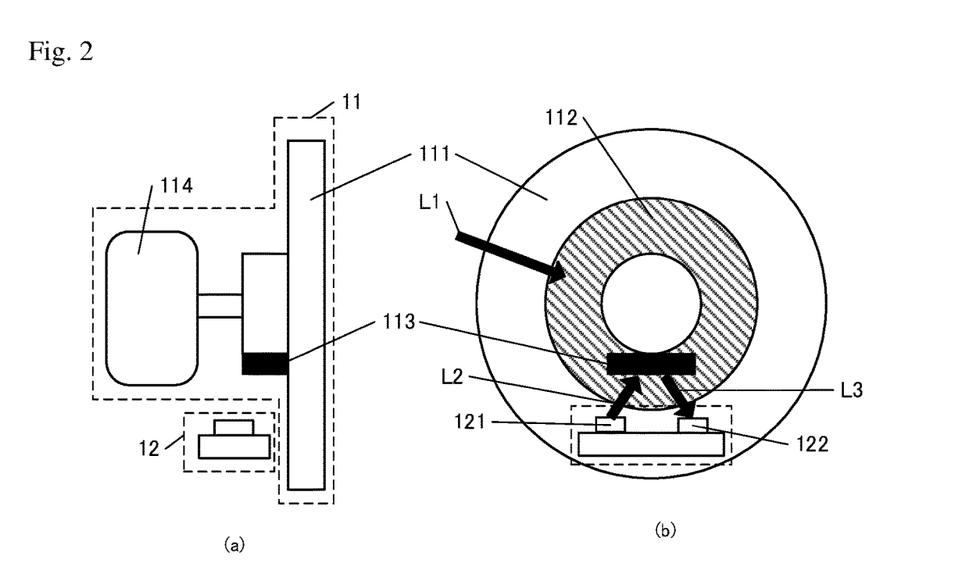
FIG. 2 is a view for describing the details of the configuration of phosphor wheel unit 11 and index detection unit 12.

FIG. 2 is a view for describing an example of the detailed configuration realized by phosphor wheel unit 11 and index detection unit 12. FIG. 2 includes a side view (FIG. 2(a)) and frontal view (FIG. 2(b)) of phosphor wheel unit 11 and index detection unit 12.

Phosphor wheel unit 11 has disk-shaped wheel 111. Phosphor 112 is applied to a portion of wheel 111. Phosphor 112 is applied in a circular shape that is concentric with wheel 111 such that excitation light L1 is continuously irradiated upon phosphor 112 despite the rotation of wheel 111 in FIG. 2. In addition, index 113 that reflects infrared light is provided on wheel 111. Index 113 is provided on a portion of wheel 111 such that infrared light L2 is irradiated upon index 113 in a portion of the interval of one rotation of wheel 111. Phosphor wheel unit 11 further includes motor 114 that rotates wheel 111. In phosphor wheel unit 11, wheel 111 is rotated by motor 114 to change the position on wheel 111 that is irradiated by excitation light.

Index detection unit 12 detects that wheel 111 of phosphor wheel unit 11 has undergone one rotation by detecting index 113 that is provided on phosphor wheel unit 11. Index detection unit 12 includes infrared light output unit 121 and optical sensor 122. Infrared light output unit 121 emits infrared light. Infrared light output unit 121 is located such that the emitted infrared light is irradiated upon index 113 of wheel 111. Optical sensor 122 is a sensor that detects infrared light and is able to detect reflected light L3 that is reflected by index 113 when infrared light output unit 121 irradiates infrared light upon wheel 111. Optical sensor 122 detects light by converting reflected light L3 to an electric signal. In addition, optical sensor 122 supplies this electric signal to phosphor wheel control unit 13 and drive voltage supply unit 14 as an index signal that is the detection result.

The explanation here returns to FIG. 1.

Phosphor wheel control unit 13 controls the rotation of phosphor wheel unit 11. More specifically, phosphor wheel control unit 13 effects control such that wheel 111 of phosphor wheel unit 11 rotates at a predetermined speed, for example, a fixed speed.

Drive voltage supply unit 14 is a control unit that changes the intensity of excitation light on the basis of the detection result of index detection unit 12 and the fluorescence characteristic of wheel 111. More specifically, drive voltage supply unit 14 changes the intensity of the excitation light by changing the magnitude of the drive voltage that is supplied to laser diode unit 15. At this time, drive voltage supply unit 14 changes the intensity of the excitation light such that the change in the intensity of the fluorescence emitted by wheel 111 during one rotation of wheel 111 is reduced. The intensity of the excitation light is determined relation to the position on wheel 111 that is irradiated by excitation light. More specifically, the intensity of the excitation light is determined as a pattern of the change in intensity during one rotation of wheel 111. In this way, drive voltage supply unit 14 is able to cause irradiation of excitation light that has corresponding intensity upon a predetermined position on wheel 111 by, on the basis of the detection result of index detection unit 12, changing the intensity of the excitation light in synchronization with the rotation of wheel 111. Accordingly, when the rotation speed of wheel 111 changes, drive voltage supply unit 14 changes the speed at which the intensity of the excitation light changes in accordance with the rotation speed.

More specifically, drive voltage supply unit 14 includes alternating-current voltage generating unit 16, laser power supply unit 17, and first superposing unit 18. Alternating-current voltage generating unit 16 receives the index signal supplied by index detection unit 12 and uses the received index signal and characteristics information to generate and supply alternating-current voltage whose magnitude changes in synchronization with the rotation of phosphor wheel unit 11. Laser power supply unit 17 is a power supply unit that generates and supplies voltage whose magnitude accords with feedback voltage from laser diode unit 15. Laser power supply unit 17 generates and supplies a direct-current voltage. First superposing unit 18 superposes the alternating-current voltage supplied by alternating-current voltage generating unit 16 upon the direct-current voltage supplied by laser power supply unit 17 and supplies the result as the drive voltage.

Figure 3:
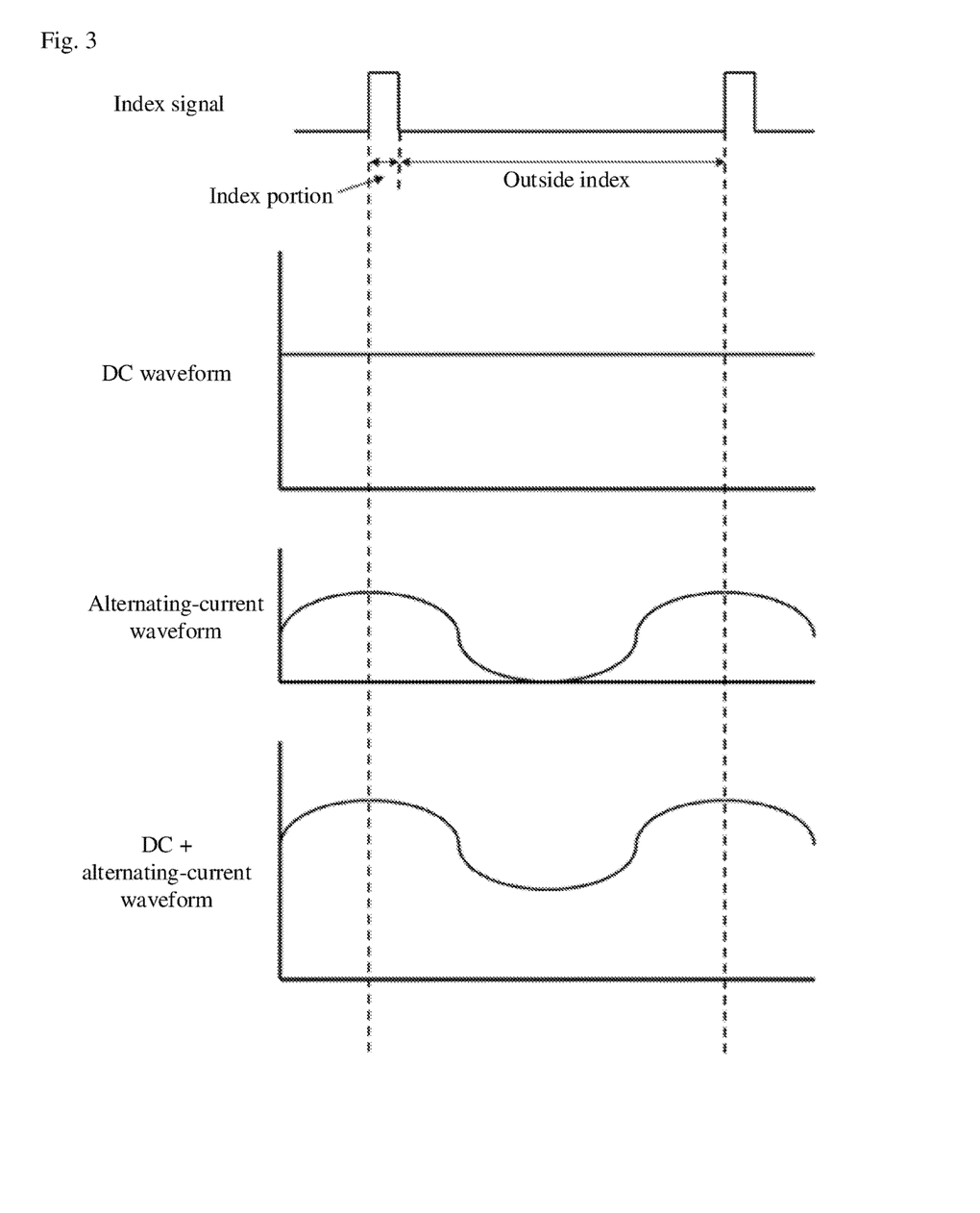
FIG. 3 is a waveform diagram for describing generation of a drive voltage.

FIG. 3 is a waveform diagram for describing the generation of the drive voltage. Alternating-current voltage generating unit 16, upon receiving an index signal as shown in FIG. 3, generates an alternating-current voltage whose magnitude periodically changes with one period being from the time point at which the value of the index signal equals or exceeds a predetermined threshold value until the time point at which the value of the index signal next equals or exceeds the predetermined threshold value. The change pattern of the alternating-current voltage is determined on the basis of the fluorescence characteristic of phosphor wheel unit 11. More specifically, the fluorescence characteristic is the change in intensity of fluorescence emitted by wheel 111 when light that has a fixed intensity is emitted from laser diode unit 15. Alternating-current voltage generating unit 16 includes a memory that stores characteristics information that indicates the fluorescence characteristic that was measured in advance and is able to generate alternating-current voltage on the basis of this characteristics information. Laser power supply unit 17 generates and supplies direct-current (DC) voltage.

First superposing unit 18 then superposes the alternating-current voltage generated by alternating-current voltage generating unit 16 upon the direct-current voltage generated by laser power supply unit 17 and supplies the result to laser diode unit 15 as a drive voltage. As a result, alternating-current voltage generating unit 16 is able to regulate the intensity of the excitation light that is irradiated upon wheel 111 by changing the magnitude of the alternating-current voltage in synchronization with the rotation of wheel 111.

The characteristics information that alternating-current voltage generating unit 16 uses for generating the alternating-current voltage, for example, shows a pattern of change of the drive voltage that is based on the fluorescence characteristic for each wheel 111. The fluorescence characteristic of wheel 111 is, for example, the change in intensity of fluorescence that is emitted by wheel 111 when light that has a fixed intensity is irradiated by from laser diode unit 15. The characteristics information is, for example, information that is supplied from the outside and stored in a memory of alternating-current voltage generating unit 16. By generating voltage of a value that accords with the characteristics information in synchronization with the rotation of wheel 111 and then supplying the voltage to laser diode unit 15, the magnitude of the drive voltage that is supplied to laser diode unit 15 is changed in synchronization with the rotation of wheel 111. In addition, by changing the magnitude of the drive voltage, the intensity of the excitation light that is irradiated upon wheel 111 is changed in synchronization with the rotation of wheel 111.

In FIG. 3, the waveform of the alternating-current voltage that is generated by alternating-current voltage generating unit 16 is a sine wave, but the waveform of the alternating-current voltage is not limited to a sine wave. For example, light that has a fixed intensity is irradiated upon phosphor wheel unit 11, the intensity of the fluorescence emitted at this time is measured in advance, and the change pattern of the alternating-current voltage is determined on the basis of the measured intensity. More specifically, alternating-current voltage generating unit 16 makes the alternating-current voltage higher to the degree that, when light that has a fixed intensity is irradiated, the intensity of the fluorescence that is emitted by a portion to which excitation light is irradiated is low . Conversely, the higher the intensity of fluorescence that is emitted when light that has a fixed intensity is irradiated, the lower alternating-current voltage generating unit 16 makes the alternating-current voltage. In this way, changes in the intensity of the fluorescence are reduced.

In addition, the change in the intensity of fluorescence is not recognized by the human eye as flicker according to the degree of the change in intensity of fluorescence. As a result, the value of the intensity of the excitation light does not necessarily have to be changed according to minute changes of the measured intensity of fluorescence. The intensity of the excitation light may be changed by changing the magnitude of the drive voltage when the measured intensity of fluorescence diverges from a predetermined range, and a direct-current voltage of a fixed magnitude may be taken as the drive voltage when the intensity of the fluorescence is within the predetermined range. For example, the characteristics information may be determined such that the excitation light peaks at a position on wheel 111 at which the intensity of the fluorescence diverges from the predetermined range. The waveform of the alternating-current voltage indicated by the characteristics information can be a sine wave, a triangular wave, a pulse wave, or a combination of these waves.

For example, when there is a depression in the phosphor on phosphor wheel unit 11, the thickness of the phosphor in the depressed portion is reduced, whereby the fluorescence that is emitted by phosphor wheel unit 11 when excitation light that has a fixed intensity is irradiated will weaken at the timing at which the excitation light is irradiated upon this depressed portion and will therefore diverge from the predetermined range. When the depression is in one location and phosphor wheel unit 11 is rotating at 7200 rpm, a drop occurs in the intensity of fluorescence at 120 Hz cycle (8.3 msec spacing) and is recognized as flicker depending on the degree of this change. In order to reduce this flicker, alternating-current voltage generating unit 16 generates an alternating-current voltage having a 120-Hz cycle. Alternating-current voltage generating unit 16 uses the phase difference from the index signal to adjust the peak position of the alternating-current voltage and makes the excitation light that is emitted at the time of the peak of alternating-current voltage irradiate the depressed portion of the phosphor. At the position of the peak of the index signal, excitation light is irradiated upon the predetermined position of phosphor wheel unit 11. The peak of the excitation light can be adjusted to any position of phosphor wheel unit 11 by using the phase difference from this position.

Alternating-current voltage generating unit 16 is able to generate the alternating-current voltage by using a pulse wave, triangular wave, or sine wave. The waveform that is used is selected according to the level and state of the depression. For example, when a pulse wave of positive polarity is used, the waveform of the alternating-current voltage that is generated by alternating-current voltage generating unit 16 is an alternating-current waveform in which a single pulse wave is generated at a cycle of 120 Hz. The intensity of the excitation light that irradiates the depressed portion is therefore increased, whereby change in the intensity of the fluorescence can be reduced. In addition, alternating-current voltage generating unit 16 decreases the alternating-current voltage in areas other than the depressed portion and is consequently able to reduce change in the intensity of the fluorescence.

When there are a plurality of portions having variations in the fluorescence characteristic due to, for example, depressions of the phosphor on phosphor wheel unit 11, alternating-current voltage generating unit 16 selects pulse waves, triangular waves and sine waves for each depression and generates alternating-current voltage by superposing these waves. When analyzed by separating for each depression, the cycle at which a strong/weak of fluorescence is produced when excitation light that has a uniform intensity is irradiated is a cycle that accords with the rotation speed of phosphor wheel unit 11, this being 120 Hz in the above-described example. Accordingly, the waveform of the alternating-current voltage is a waveform in which, for example, a number of pulse waves that are equal to the number of depressions are superposed, each wave having a 120-Hz cycle.

The explanation here returns to FIG. 1.

Laser diode unit 15 is an excitation light source unit that emits, as excitation light L1, laser light that has an intensity according to the magnitude of the supplied drive voltage. Laser diode unit 15 receives the drive voltage that is supplied from drive voltage supply unit 14. Since the magnitude of this drive voltage changes in synchronization with the rotation of phosphor wheel unit 11, the intensity of the excitation light that is emitted by laser diode unit 15 changes in synchronization with the rotation of phosphor wheel unit 11. Excitation light L1 that is emitted from laser diode unit 15 is irradiated upon phosphor wheel unit 11. In addition, laser diode unit 15 supplies feedback voltage according to the intensity of the excitation light to drive voltage supply unit 14.

As described hereinabove, according to the first exemplary embodiment of the present invention, light source device 10 includes laser diode unit 15, phosphor wheel unit 11, index detection unit 12, and drive voltage supply unit 14. Laser diode unit 15 emits excitation light. Phosphor wheel unit 11 includes wheel 111 that emits fluorescence in response to excitation light, and by causing wheel 111 to rotate, changes the position on wheel 111 that is irradiated by the excitation light. Index detection unit 12 detects the rotation of wheel 111. Drive voltage supply unit 14 changes the intensity of the excitation light on the basis of the detection result of index detection unit 12 and the fluorescence characteristic of wheel 111.

In this way, excitation light that changes in intensity on the basis of the detection result of the rotation of wheel 111 and the fluorescence characteristic of wheel 111 is irradiated upon phosphor wheel unit 11. As a result, even when there is change in the intensity of fluorescence emitted when light that has a fixed intensity is irradiated upon phosphor wheel unit 11, this change can be cancelled by changing the intensity of the fluorescence in accordance with the change in intensity of the excitation light to enable reduction of the change in intensity of the fluorescence. Here, there is no need to raise the rotation speed of wheel 111, and accordingly, the occurrence of flicker can be reduced without shortening the service life of the motor even when variation occurs in the fluorescence characteristic of the phosphor wheel.

In addition, according to the above-described exemplary embodiment, the fluorescence characteristic is the change in the intensity of fluorescence produced by wheel 111 when light that has a fixed intensity is emitted from laser diode unit 15. As a result, the intensity of the excitation light is changed on the basis of the change in intensity of the fluorescence that is actually produced by wheel 111 when the intensity of the excitation light is fixed, and the change in intensity of the fluorescence can be more reliably reduced. Accordingly, even when there is variation in the fluorescence characteristic of a phosphor wheel, the occurrence of flicker can be more reliably reduced without shortening the service life of the motor.

Further, according to the above-described exemplary embodiment, drive voltage supply unit 14 changes the intensity of excitation light in accordance with the change pattern that was predetermined in advance on the basis of the fluorescence characteristic of wheel 111. In this way, the processing load for changing the intensity of excitation light is mitigated. Accordingly, even when there is variation in the fluorescence characteristic of a phosphor wheel, the occurrence of flicker can be more reliably reduced without shortening the service life of a motor.

Still further, according to the above-described exemplary embodiment, drive voltage supply unit 14 stores the characteristics information that indicates the fluorescence characteristic and changes the intensity of the excitation light on the basis of the fluorescence characteristic indicated by the stored characteristics information. As a result, the fluorescence characteristic indicated by the stored characteristics information can be used even without measuring the fluorescence characteristic during operation, and there is consequently no need for light source device 10 to include a structure for measuring the fluorescence characteristic. Accordingly, the occurrence of flicker can be reduced while limiting the scale of the device of light source device 10 and without shortening the life of the motor even when there is variation of the fluorescence characteristic of a phosphor wheel.

In addition, according to the above-described exemplary embodiment, drive voltage supply unit 14 changes the intensity of the excitation light in synchronization with the rotation of wheel 111 on the basis of the detection result. In this way, the intensity of excitation light can be changed in association with the position on wheel 111 that is irradiated by the excitation light, and the intensity of the excitation light can be changed in association with the state of the phosphor that has been applied to wheel 111. Accordingly, the occurrence of flicker can be more reliably reduced without shortening the service life of a motor even when there is variation in the fluorescence characteristic of the phosphor wheel.

In addition, according to the above-described exemplary embodiment, when light that has a fixed intensity is emitted from laser diode unit 15, drive voltage supply unit 14 changes the intensity of excitation light such that a peak in the excitation light comes at the position on wheel 111 at which the intensity of the fluorescence diverges from a predetermined range. In this way, when the intensity of the produced fluorescence changes in accordance with the position on wheel 111, the excitation light changes greatly at the point at which change in intensity is great. Accordingly, the occurrence of flicker can be more reliably reduced without shortening the service life of a motor even when there is variation in the fluorescence characteristic of the phosphor wheel.

Further, according to the above-described exemplary embodiment, drive voltage supply unit 14 changes the intensity of excitation light by changing the drive voltage that is supplied to laser diode unit 15. In this way, laser diode unit 15 changes the intensity of the excitation light itself that is emitted, whereby the intensity of the excitation light can be changed without decreasing the utilization efficiency of the excitation light that is emitted by laser diode unit 15.

Finally, according to the above-described exemplary embodiment, drive voltage supply unit 14 includes alternating-current voltage generating unit 16, laser power supply unit 17, and first superposing unit 18. Alternating-current voltage generating unit 16 generates an alternating-current voltage whose magnitude changes on the basis of the detection result of rotation and the fluorescence characteristic of wheel 111. Laser power supply unit 17 generates and supplies a direct-current voltage. First superposing unit 18 superposes the alternating-current voltage upon the direct-current voltage supplied by laser power supply unit 17 and takes the result as the drive voltage. In this way, laser power supply unit 17 need not be a component that is compatible with high frequency, and drive voltage supply unit 14 can be configured without being affected by the characteristics of laser power supply unit 17.

Second Exemplary Embodiment

Figure 4:
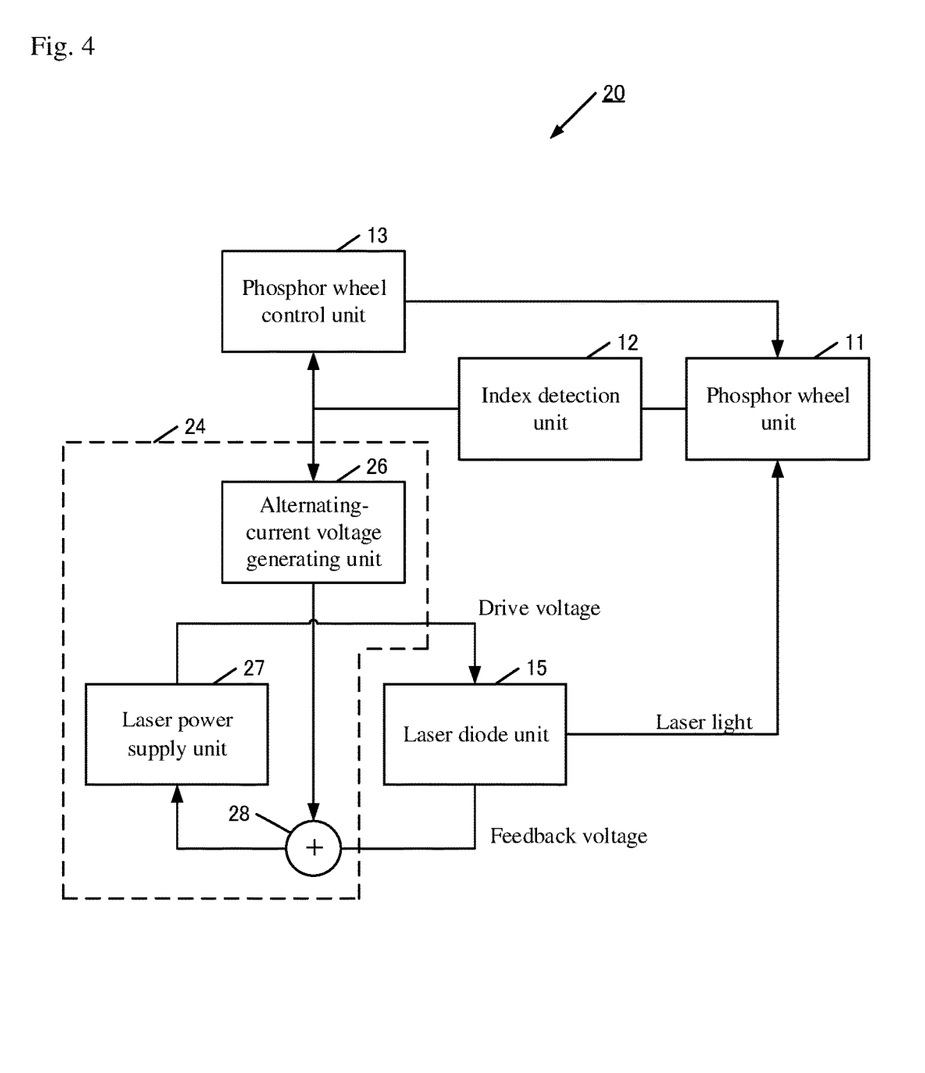
FIG. 4 is a block diagram showing the configuration of the light source device according to the second exemplary embodiment of the present invention.

FIG. 4 is a block diagram showing the configuration of light source device 20 according to the second exemplary embodiment of the present invention. Light source device 20 includes phosphor wheel unit 11, index detection unit 12, phosphor wheel control unit 13, laser diode unit 15, and drive voltage supply unit 24. The functions of phosphor wheel unit 11, index detection unit 12, phosphor wheel control unit 13, and laser diode unit 15 are the same as those in light source device 10 according to the first exemplary embodiment and redundant explanation of the shared components is therefore omitted. The following explanation will mainly deal with the points of difference with light source device 10.

Drive voltage supply unit 14 includes alternating-current voltage generating unit 26, laser power supply unit 27, and second superposing unit 28.

Alternating-current voltage generating unit 26 receives the index signal that is supplied from index detection unit 12 and uses the received index signal to generate alternating-current voltage that is synchronized with the rotation of phosphor wheel unit 11. Alternating-current voltage generating unit 26 supplies the generated alternating-current voltage to second superposing unit 28.

Second superposing unit 28 receives the feedback voltage supplied from laser diode unit 15 and the alternating-current voltage that was applied as input from alternating-current voltage generating unit 26 and generates and supplies a superposed voltage in which the alternating-current voltage is superposed on the feedback voltage.

Laser power supply unit 27 receives the superposed voltage that was supplied from second superposing unit 28 and supplies as the drive voltage a voltage whose magnitude accords with received superposed voltage. The superposed voltage supplied by second superposing unit 28 is a high-frequency voltage in which alternating-current voltages are superposed, and laser power supply unit 27 therefore must be compatible with high-frequency voltage.

Compared with drive voltage supply unit 14 of light source device 10 according to the first exemplary embodiment, this drive voltage supply unit 24 can limit circuit scale and can be configured by inexpensive circuits because second superposing unit 28 need not carry out processing by using high voltage component.

As described hereinabove, by means of light source device 20 according to the second exemplary embodiment of the present invention, laser diode unit 15 supplies feedback voltage that accords with the intensity of the excitation light to drive voltage supply unit 24. In addition, drive voltage supply unit 24 includes alternating-current voltage generating unit 26, laser power supply unit 27, and second superposing unit 28. Alternating-current voltage generating unit 26 generates an alternating-current voltage whose magnitude changes on the basis of the detection result of the rotation of wheel 111 and the fluorescence characteristic of wheel 111. In addition, second superposing unit 28 generates and supplies a superposed voltage in which an alternating-current voltage is superposed on the feedback voltage. Laser power supply unit 27 supplies as the drive voltage a voltage whose magnitude accords with the superposed voltage. In this way, second superposing unit 28 need not carry out processing of a high-voltage component and can therefore be configured by inexpensive circuits and can limit circuit scale.

Although the invention of the present application has been described hereinabove with reference to exemplary embodiments, the invention of the present application is not limited to the above-described exemplary embodiments. The configuration and details of the invention of the present application are open to various modifications within the scope of the invention of the present application that will be clear to one of ordinary skill in the art.

Modification

For example, in the above-described exemplary embodiments, index detection unit 12 was described as an example of a rotation detection unit, but the present invention is not limited to this example. The rotation detection unit may be any component that can detect the rotation of phosphor wheel unit 11. For example, the rotation detection unit may be realized using an electromagnetic rotation angle sensor.

In addition, in the above-described exemplary embodiments, the characteristics information was assumed to be generated based on a fluorescence characteristic that was measured in advance and stored in memory belonging to alternating-current voltage generating unit 16, but the present invention is not limited to this example. For example, the fluorescence characteristic need not be measured in advance, and light source device 10 or light source device 20 may have a function for measuring the fluorescence characteristic and may measure the fluorescence characteristic and generate characteristics information either during operation or immediately before starting operation by light source device 10 or light source device 20.

In addition, in the above-described exemplary embodiments, the fluorescence characteristic was taken as the change in intensity of the fluorescence that is produced by wheel 111 when light that has a fixed intensity is irradiated from laser diode unit 15, but the present invention is not limited to this example. For example, in order to suppress change in the intensity of the fluorescence that is produced in the interval of one rotation of wheel 111, the fluorescence characteristic may be taken as the intensity of the excitation light that is determined such that the intensity of fluorescence is uniform. In this case, light source device 10 and light source device 20 may store in memory the intensity of the excitation light that is determined as the characteristics information.

Further, although the configuration and operation of light source device 10 and light source device 20 have been described in the above-described exemplary embodiments, a projection display device that is equipped with light source device 10 or light source device 20 and a method of realizing the functions of light source device 10 or 20 can also be provided. The projection display device may be a device that uses only light source device 10 or 20 as a light source or may be a hybrid device that further combines the use of another light source such as an LED (Light Emitting Diode).

In the above-described exemplary embodiments, a method of changing the magnitude of the drive voltage that is supplied to laser diode unit 15 was proposed as a method of changing the intensity of excitation light that is irradiated upon wheel 111, but the present invention is not limited to this example. The method need only change the intensity of the excitation light that is irradiated upon wheel 111.

In addition, all or a portion of each of the above-described exemplary embodiments can be described as in the following NOTES but is not limited to the following.

(Supplementary Note 1)

A light source device is provided with:

an excitation light source unit that emits excitation light;

a phosphor wheel unit that includes a wheel that produces fluorescence by means of said excitation light and that, by rotating the wheel, changes the position on the wheel that is irradiated by said excitation light;

a detection unit that detects the rotation of said wheel; and a control unit that, on the basis of detection result of said detection unit and the fluorescence characteristic of said wheel, changes the intensity of said excitation light.

(Supplementary Note 2)

In the light source device as described in Supplementary Note 1, said fluorescence characteristic is the change in intensity of fluorescence that is produced by said wheel when light that has a fixed intensity is emitted from said excitation light source unit.

(Supplementary Note 3)

In the light source device as described in Supplementary Note 1 or 2, said control unit changes the intensity of said excitation light in accordance with a change pattern that is determined on the basis of said fluorescence characteristic.

(Supplementary Note 4)

In the light source device as described in any one of Supplementary Notes 1 to 3, said control unit stores characteristics information that indicates said fluorescence characteristic and changes the intensity of said excitation light on the basis of the fluorescence characteristic indicated by the characteristics information that was stored.

(Supplementary Note 5)

In the light source device as described in any one of Supplementary Notes 1 to 4, said control unit changes the intensity of said excitation light in synchronization with said rotation on the basis of said detection result.

(Supplementary Note 6)

In the light source device as described in any one of Supplementary Notes 1 to 5, when light of a fixed intensity is emitted from said excitation light source unit, said control unit changes the intensity of said excitation light such that a peak of said excitation light comes at a position on said wheel at which the intensity of said fluorescence diverges from a predetermined range.

(Supplementary Note 7)

In the light source device as described in any one of Supplementary Notes 1 to 6, said control unit changes the intensity of said excitation light by changing the drive voltage that is supplied to said excitation light source unit.

(Supplementary Note 8)

In the light source device as described in Supplementary Note 7, said control unit includes:

an alternating-current voltage generating unit that generates an alternating-current voltage on the basis of said detection result and said fluorescence characteristic;

a power supply unit that generates and supplies a direct-current voltage; and a first superposing unit that superposes said alternating-current voltage on said direct-current voltage that was supplied by said power supply unit and supplies the result as said drive voltage.

(Supplementary Note 9)

In the light source device as described in Supplementary Note 7, said excitation light source unit supplies a feedback voltage that accords with the intensity of said excitation light to said control unit; and said control unit has:

an alternating-current voltage generating unit that generates an alternating-current voltage on the basis of said detection result and said fluorescence characteristic;

a second superposing unit that supplies a superposed voltage in which said alternating-current voltage is superposed on said feedback voltage; and a power supply unit that supplies voltage whose magnitude accords with said superposed voltage as said drive voltage.

(Supplementary Note 10)

A projection display device is provided with the light source device described in any one of Supplementary Notes 1 to 9.

(Supplementary Note 11)

A light source control method includes:

by causing a wheel that produces fluorescence according to excitation light to rotate, changing a position on the wheel that is irradiated by said excitation light;

detecting rotation of said wheel; and changing the intensity of said excitation light on the basis of the detection result of said rotation and a fluorescence characteristic of said wheel.

EXPLANATION OF REFERENCE NUMBERS 10, 20 light source device
11 phosphor wheel unit
111 wheel
112 phosphor
113 index
114 motor
12 index detection unit (detection unit)
121 infrared light output unit
122 optical sensor
13 phosphor wheel control unit
14, 24 drive voltage supply unit (control unit)
15 laser diode unit (excitation light source unit)
16, 26 alternating-current voltage generating unit
17, 27 laser power supply unit (power supply unit)
18 first superposing unit
28 second superposing unit

The invention claimed is:

1. A light source device comprising:
an excitation light source unit that emits excitation light;
a phosphor wheel unit that includes a wheel that produces fluorescence by said excitation light and that, by rotating the wheel, changes a position on the wheel that is irradiated by said excitation light;
a detection unit that detects rotation of said wheel; and
a control unit that, on the basis of the detection result of said detection unit and the fluorescence characteristic of said wheel, changes an intensity of said excitation light such that a change in intensity of the fluorescence emitted by the wheel during one rotation of the wheel is reduced,
wherein said control unit changes the intensity of said excitation light by changing a drive voltage that is supplied to said excitation tight source unit and
wherein said excitation light source unit supplies a feedback voltage that accords with the intensity of said excitation light to said control unit, and
said control unit comprises:
an alternating-current voltage generating unit that generates an alternating-current voltage on the basis of said detection result and said fluorescence characteristic;
a superposing unit that supplies a superposed voltage in which said alternating-current voltage is superposed on said feedback voltage; and
a power supply unit that supplies voltage whose magnitude accords with said superposed voltage as said drive voltage.

2. The light source device as set forth in claim 1, wherein said fluorescence characteristic comprises the change in the intensity of fluorescence that is produced by said wheel when light that has a fixed intensity is emitted from said excitation light source unit.

3. The light source device as set forth in claim 1, wherein said control unit changes the intensity of said excitation light in accordance with a change pattern that is determined on the basis of said fluorescence characteristic.

4. The light source device as set forth in claim 1, wherein said control unit stores characteristics information that indicates said fluorescence characteristic and changes the intensity of said excitation light on the basis of the fluorescence characteristic indicated by the characteristics information that was stored.

5. The light source device as set forth in claim 1, wherein said control unit changes the intensity of said excitation light in synchronization with said rotation on the basis of said detection result.

6. The light source device as set forth in claim 1,
wherein the power supply unit generates and supplies a direct-current voltage; and wherein the superposing unit superposes said alternating-current voltage on said direct-current voltage that was supplied by said power supply unit and supplies the result as said drive voltage.

7. A projection display device that is provided with the light source device as set forth in claim 1.

8. The light source device as set forth in claim 1, wherein said
alternating-current voltage generating unit generates an alternating-current voltage on the basis of said detection result and said fluorescence characteristic,
wherein the power supply unit generates and supplies a direct-current voltage
wherein the first superposing unit superposes said alternating-current voltage on said direct-current voltage that was supplied by said power supply unit and supplies the result as said drive voltage,
and
wherein the control unit further comprises
a second superposing unit that supplies a superposed voltage in which said alternating-current voltage is superposed on said feedback voltage.

9. The light source device as set forth in claim 1, wherein the control unit changes the intensity of said excitation light such that the change in the intensity of the fluorescence emitted by the wheel at a beginning of the rotation of the wheel is less than the intensity of the fluorescence emitted by the wheel at an end of the rotation of the wheel.

10. The light source device as set forth in claim 1, wherein the intensity of the excitation light is changed by changing a magnitude of a drive voltage that is supplied to a laser diode unit.

11. The light source device as set forth in claim 1, wherein the intensity is determined in relation to a position on the wheel that is irradiated by the excitation light.

12. The light source device as set forth in claim 1, wherein the intensity of the excitation light is determined as a pattern of a change in intensity during one rotation of wheel.

13. The light source device as set forth in claim 1, wherein the intensity corresponds to a predetermined position on the wheel.

14. The light source device as set forth in claim 1, wherein the excitation light has a corresponding intensity upon a predetermined position on the wheel, and
wherein the intensity of the excitation light is changed in synchronization with the rotation of the wheel.

15. The light source device as set forth in claim 1, wherein the intensity is a function of a rotation speed of the wheel.

16. A light source control method comprising:
by causing rotation of a wheel that produces fluorescence according to excitation light, changing a position on the wheel that is irradiated by said excitation light;
detecting rotation of said wheel; and
changing an intensity of said excitation light on the basis of the detection result of said rotation and a fluorescence characteristic of said wheel such that a change in intensity of the fluorescence emitted by the wheel during one rotation of the wheel is reduced,
wherein the changing an intensity comprises:
changing the intensity of said excitation light by changing a drive voltage that is supplied, the method further comprising:
supplying a feedback voltage that accords with the intensity of said excitation light;
wherein the changing the intensity further comprises
generating an alternating-current voltage on the basis of said detection result and said fluorescence characteristic;
supplying a superposed voltage in which said alternating-current voltage is superposed on said feedback voltage; and
supplying voltage whose magnitude accords with said superposed voltage as said drive voltage.

* * * * *